UNITED STATES PATENT OFFICE.

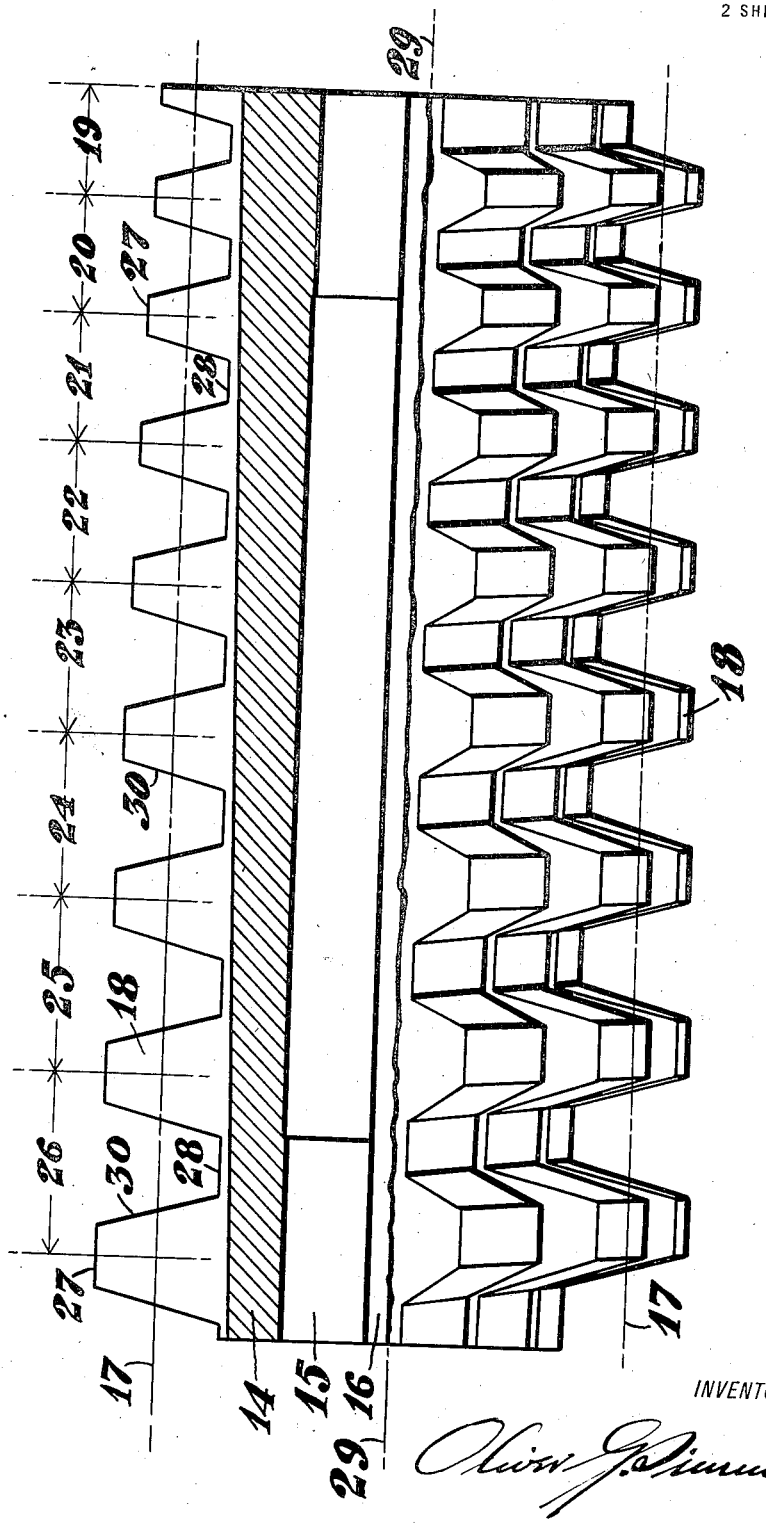

OLIVER G. SIMMONS, OF ROCHESTER, NEW YORK.

HOBBING-CUTTER.

1,269,123.

Specification of Letters Patent.   Patented June 11, 1918.

Application filed April 4, 1917.   Serial No. 159,782.

*To all whom it may concern:*

Be it known that I, OLIVER G. SIMMONS, a citizen of the United States, residing at Rochester, in the county of Monroe and State of New York, have invented a new and useful Improvement in Hobbing-Cutters, of which the following is a specification.

This invention relates to hobbing cutters for generating the teeth of bevel gears.

An object of the invention consists in providing a hobbing cutter with teeth the pitch of which will vary according to the varying pitch of the bevel gear adapted to be cut.

Another object of the invention consists in providing a hobbing cutter with a varying pitch and teeth of varying length and width; said teeth further provided with cutting surfaces, which in operation, when said hob is secured to an arbor in a machine adapted to the work, will generate the teeth of bevel gears on true involute curves, the lead of said curves varying directly as the perimeters of the infinite evolutes constituting the surface of the oblique base circle cone of the bevel gear.

Further objects of the invention will more clearly hereinafter appear.

Referring now to the accompanying drawings, in which—

Fig. 2, is a view, partly in elevation and partly in section, of my hob, the quarter section shown being taken in a vertical central plane.

Figure 1:
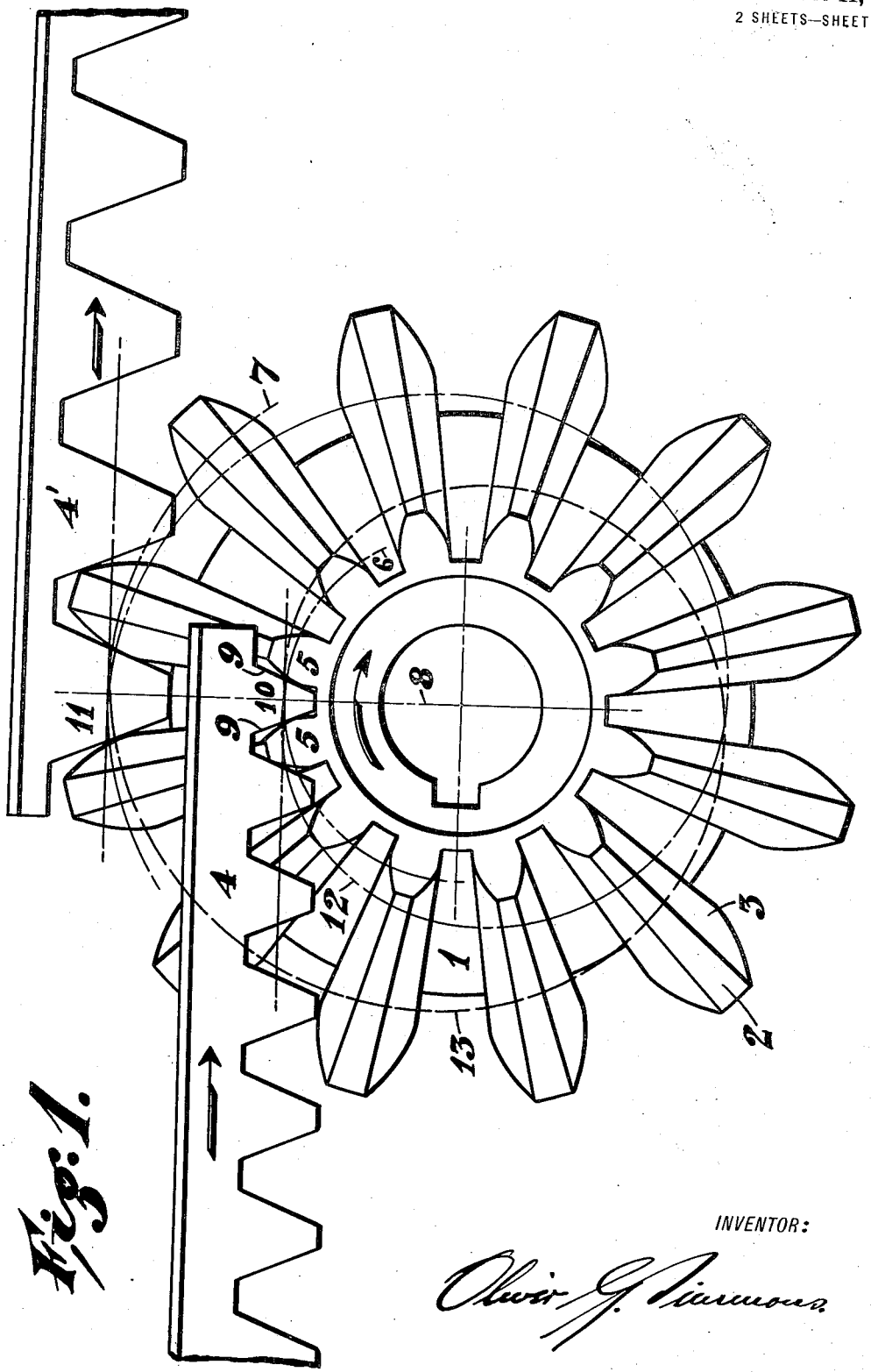
Figure 1, is a plan elevation showing the adaptation of the molding generating principle as the underlying principle in generating the teeth of bevel gears by the hobbing method.

Referring to Fig. 1, the numeral 1 indicates a bevel gear provided with the teeth 2, each tooth of which is provided with working faces in the form of involute surfaces 3, which surfaces are made up of an infinite number of involute curves because of the infinite number of diameters forming the surface of the oblique base circular cone, which is the evolute of the involute surface. The lead of any given involute curve forming part of the involute surface will equal the perimeter of the corresponding circle forming part of the base cone surface and from this fact it is evident that the measure of the lead of an involute curve, taken at a given point on a cone surface, will be greater than the measure of the lead of an involute curve taken at a point nearer the apex of the cone, and further, that owing to the fact that the evolute, of the involute surface, is the surface of a circular cone, the infinite number of involute curves of such an evolute will in themselves form an involute curved surface, above referred to, and all straight lines lying on this surface and intersecting the apex of the evolute, will also intersect corresponding points on the involute surface.

In the special case of a bevel gear, the evolute becomes of frusto conical shape, or more accurately stated, the frustum of an oblique circular cone and the involute curved surfaces, one right and one left hand, will form the opposite faces of each tooth.

Assuming the above to hold true, it is apparent that to hob a bevel gear a hobbing cutter will necessarily have to be provided with teeth of varying pitch, length and width, and from the above, it is evident that the pitch, length and width of the teeth will increase uniformly, preferably from one end of the hob to the other. I have, therefore, provided the following as a demonstration to prove the truth of the proposition.

Referring to Fig. 1, let it be assumed that the numeral 4 indicates a blank strip of plastic material and that said strip is forced into the teeth 5 of the bevel gear 1 at the inner edge and at right angles to the pitch cone surface indicated by the numerals 6 and 7, representing the pitch circles at the smaller and larger ends of the bevel gear. The other end of the plastic strip is then moved, moving the strip as a whole at an angle to the center line 8 so that said other end will line up with the outer pitch circle 7 at the end of the movement about to be described.

The gear 1 is then rocked slightly to form the inclined sides 9 of the tooth 10, of the plastic strip 4, which strip is then moved uniformly over and in contact with the rolling movement, in the direction of the arrows, of the gear 1. In such operation the teeth 2 of the gear will moldingly generate the teeth in the plastic strip 4, and if a whole turn has been given to the gear 1, the plastic strip 4, due to its angle with the pitch surface center line 8, will contact with all of the teeth in the gear and at different points on the face of same, and at the end of such movement, the plastic strip 4 will have assumed the position as indicated by the numeral 4' at which position the gear should be rocked slightly to finish the tooth 11 of the strip.

In the above movement, the teeth of the strip will contact with the face of the gear as represented by the spiral helical curved long and short dash line 12. The opposite hand curve is indicated by the numeral 13 which enables the movement to be followed either way the gear is turned.

It is now obvious that in the above proposition, the teeth generated in the plastic strip in contact with the bevel gear as described would have a pitch, tooth length and width for its own length varying accordingly as these factors changed in the gear itself and that said change would necessarily be uniform as the teeth of the bevel gear indicate upon inspection.

It is obvious also that the plastic strip though shown as a substantially straight parallel strip, could be curved either convex or concave and obtain equally good results.

It is now apparent that to hob bevel gears it is only necessary to construct a hob upon the principle above described, place said hob in a suitable machine adapted for the purpose and with certain movements of said hob and gear, relative to each other, the teeth of bevel gears can be generated each having working faces of involute curved surfaces.

The hob shown in Fig. 2, is an embodiment of the principle previously described in which the numeral 14 indicates the hob provided with the usual bore 15 and keyway 16, adapting said hob to be secured to an arbor of a machine suitable for the purpose. The lines 17 are lines of the pitch surface of the hob 1, which, when the hob is in operation, will be tangent to the pitch cone surface of the gear being cut. These lines are shown as straight and parallel to each other but it is to be understood I do not wish to limit myself to such construction for as previously referred to, these lines may be arranged in the form of a curve. The numeral 18 indicates the teeth of the hob which, as shown, are of varying length and width and of varying pitch as indicated by the numerals 19, 20, 21, 22, 23, 24, 25 and 26.

From the proposition of Fig. 1, and owing to the converging of the involute surfaces to the apex of the bevel gear cone, the pitch of the hob, above referred to, will increase uniformly from one end to the other as shown.

It is to be observed that the tops 27 of the teeth of the hob as well as the bottom 28 form a taper, the lines of which will converge at one end of the hob. This will hold true whether said pitch surface line 17 is straight and parallel to the center line 29 of the hob, or whether said pitch line 17 is in the form of a curve. In the latter event, it is understood, of course, that the tops 27 and bottoms 28 of the teeth will be straight lines the median point of which will coincide with a curved line, as will be understood by those skilled in this art.

The numeral 30 indicates the inclined cutting sides of the teeth, said inclination corresponding to the angle of pressure adopted.

The hob can be threaded in either a thread milling machine or in a lathe with the use of a special attachment. The hob will then be gashed forming the flutes, after which the teeth of the hob will be relieved for the usual purpose and the whole hardened, tempered and ground.

Having described my invention, I claim:

1. A hob for hobbing bevel gears provided with a thread of uniformly varying pitch substantially equal to the uniformly varying circular pitch of the bevel gear adapted to be cut.

2. A hob of uniformly varying pitch, the smallest and greatest pitch of which is located at opposite ends of said hob.

3. A hob for hobbing bevel gears provided with a thread of gradually increasing pitch from one end of the hob to the opposite end substantially as set forth.

4. A hob of increased pitch, the increase of which pitch is uniform from one end of the hob to the opposite end, the measure of the increase of the pitch equaling the measure of the decrease of the pitch at any two given adjacent pitch points.

5. A hob for hobbing bevel gears, provided with teeth arranged in the form of a thread of increased pitch, said teeth varying uniformly in depth from one end of the hob to the opposite end.

6. A hob for hobbing bevel gears, provided with teeth arranged in the form of a thread of uniformly increased pitch from one end of the hob to the opposite end, said teeth varying uniformly in width, when measured on the pitch line, from one end of the hob to the opposite end.

7. A hob provided with teeth for generating the teeth of bevel gears, said hob teeth being arranged in the form of a thread, said thread varying uniformly in pitch, depth and width from one end of the hob to the other end.

8. A hob of the class described provided with cutting teeth, the cutting surfaces of which teeth are uniformly increased from one end of the hob to the other end.

9. A new article of manufacture consisting of a hob for hobbing bevel gears, said hob being provided with cutting teeth arranged in the form of a thread of uniformly increased pitch; the depth, width and cutting surfaces of which teeth increase according to said uniformly increasing pitch.

Signed this 27 day of March, 1917.

OLIVER G. SIMMONS.